United States Patent [19]

Freeman et al.

[11] Patent Number: 5,258,159
[45] Date of Patent: Nov. 2, 1993

[54] PROCESS FOR MAKING A FIBER REINFORCED FUEL TANK

[75] Inventors: Richard B. Freeman, Oxford; Bruce N. Greve, Davisburg, both of Mich.

[73] Assignee: The Budd Company, Troy, Mich.

[21] Appl. No.: 851,758

[22] Filed: Mar. 16, 1992

Related U.S. Application Data

[60] Division of Ser. No. 668,758, Mar. 14, 1991, abandoned, which is a continuation of Ser. No. 517,936, May 2, 1990, abandoned.

[51] Int. Cl.$^5$ .............................................. B29C 45/14
[52] U.S. Cl. .................................. 264/513; 264/258; 264/279
[58] Field of Search ............... 264/513, 257, 258, 279, 264/279.1, 512, 515, 266, 313, 314, 317

[56] References Cited

U.S. PATENT DOCUMENTS

| | | | |
|---|---|---|---|
| 2,421,613 | 6/1947 | Gray et al. | 154/43.5 |
| 2,594,235 | 4/1952 | Taylor | 150/0.5 |
| 2,615,487 | 10/1952 | Cunningham | 150/0.5 |
| 3,330,439 | 7/1967 | Moorman | 220/86 |
| 3,339,783 | 9/1967 | Gorman | 220/15 |
| 3,381,843 | 5/1968 | Forman et al. | 220/9 |
| 3,470,907 | 10/1969 | Shockey | 137/590 |
| 3,504,820 | 4/1970 | Barthel | 220/9 |
| 3,509,016 | 4/1970 | Underwood et al. | 161/190 |
| 3,534,884 | 10/1970 | Suter | 220/85 |
| 3,552,599 | 1/1971 | Redding | 220/72 |
| 3,561,639 | 2/1971 | Allen | 220/88 |
| 3,567,536 | 3/1971 | Wickersham, Jr. | 156/78 |
| 3,595,422 | 7/1971 | Durrett, Jr. | 220/5 A |
| 3,610,457 | 10/1971 | Opalewski | 220/22 |
| 3,901,281 | 8/1975 | Morrisey | 138/140 |
| 3,904,068 | 9/1975 | Beaujean | 220/63 R |
| 3,951,190 | 4/1976 | Suter | 150/0.5 |
| 4,004,706 | 1/1977 | Guldenfels et al. | 220/3 |
| 4,314,964 | 2/1982 | Ferrary | 264/513 |
| 4,416,303 | 11/1983 | Scheurenbrand | 137/576 |
| 4,453,564 | 6/1984 | Bergesio | 137/135 |
| 4,482,075 | 11/1984 | Stotz et al. | 220/86 R |
| 4,504,530 | 3/1985 | Bliley | 428/35 |
| 4,518,091 | 5/1985 | Scheurenbrand et al. | 220/5 A |
| 4,579,249 | 4/1986 | Patterson et al. | 220/421 |
| 4,597,425 | 7/1986 | Tally | 150/55 |
| 4,602,722 | 7/1986 | Ives | 220/414 |
| 4,625,892 | 12/1986 | Carlin, Jr. | 220/465 |
| 4,625,980 | 12/1986 | Lyzohub | 280/5 A |
| 4,660,738 | 4/1987 | Ives | 220/414 |
| 4,739,659 | 4/1988 | Sharp | 73/49.2 |
| 4,740,346 | 4/1988 | Freeman | 264/258 |
| 4,768,678 | 9/1988 | Nusbaumer et al. | 220/444 |
| 4,819,821 | 4/1989 | Sharp | 220/5 A |
| 4,842,798 | 6/1989 | Mott | 264/313 |
| 4,844,287 | 7/1989 | Long | 220/429 |
| 4,849,147 | 7/1989 | Freeman | 264/138 |
| 4,859,262 | 8/1989 | Sharp | 156/155 |
| 4,863,771 | 9/1989 | Freeman | 428/36.1 |
| 4,876,124 | 10/1989 | Dallum | 428/34.5 |
| 4,890,764 | 1/1990 | Rossini | 220/460 |
| 4,911,876 | 3/1990 | Freeman | 264/258 |
| 4,925,044 | 5/1990 | Hembert | 220/3 |
| 4,993,581 | 2/1991 | Mitchell | 220/453 |
| 5,000,342 | 3/1991 | Sharp | 220/454 |
| 5,000,990 | 3/1991 | Freeman | 428/36.1 |
| 5,020,687 | 6/1991 | Seizert | 220/645 |
| 5,080,850 | 1/1992 | Holloway | 264/313 |

FOREIGN PATENT DOCUMENTS

| | | |
|---|---|---|
| 214296 | 8/1960 | Austria . |
| 0363744 | 4/1990 | European Pat. Off. . |
| 0373458 | 6/1990 | European Pat. Off. . |
| 2049405 | 4/1972 | Fed. Rep. of Germany . |
| 2340257 | 2/1975 | Fed. Rep. of Germany . |
| 2537144 | 3/1977 | Fed. Rep. of Germany . |
| 2719449 | 11/1978 | Fed. Rep. of Germany . |
| 2913471 | 10/1980 | Fed. Rep. of Germany . |
| 8704982 | 7/1987 | Fed. Rep. of Germany . |
| 2160162 | 6/1973 | France . |
| 1180896 | 2/1970 | United Kingdom . |

Primary Examiner—Catherine Timm
Attorney, Agent, or Firm—Harness, Dickey & Pierce

[57] ABSTRACT

A fiber reinforced plastic fuel tank includes a multipurpose inner liner that serves as an aid during molding as well as a corrosion resistant protector and/or secondary fuel container for the tank when in use. This plastic fuel tank is molded by first covering an exterior surface of the inner liner with a fibrous material. The inner liner is then placed into a mold and pressurized. Thereafter, resin is injected into the mold, impregnating the fibrous material, while the inner liner supports the resin injected material to define a hollow interior for the tank. Once the resin has been injected into the mold, the resin is cured to form the molded tank.

6 Claims, 3 Drawing Sheets

PROCESS FOR MAKING A FIBER REINFORCED FUEL TANK

This is a division of U.S. patent application Ser. No. 07/668,758, filed Mar. 14, 1991, entitled "Composite Fuel Tank" now abandoned, which is a continuation of Ser. No. 07/517,936, filed May 2, 1990, now abandoned.

BACKGROUND OF THE INVENTION

1. Technical Field

This invention relates to fuel tanks and, more particularly, to fuel tanks made of plastic material.

2. Discussion

The desire for a fuel efficient and durable vehicle that satisfies the requirements of today's sophisticated consumer has placed difficult demands on modern fuel tank design. Plastic fuel tanks are gaining notoriety for meeting these demands. One such demand is the desire to reduce overall vehicle mass. The use of a lightweight plastic fuel tank, rather than a conventional metal fuel tank, helps achieve the goal of reduced vehicle mass.

Another demand on today's vehicle design is roominess in the passenger compartment. Increasing the roominess of the passenger compartment, without increasing the overall size of the vehicle, results in a cramped engine compartment and under carriage. This cramping of the under carriage conflicts with the consumer's desire to have a larger gas tank and thereby have longer range between fill-ups. To accommodate an optimal design of maximum tank volume in a minimum of available under carriage space, the fuel tank design required for a given vehicle may be one of irregular shape. Conventional metal gas tanks, generally being produced by a stamping operation, typically cannot easily meet these irregular shape requirements.

Another common characteristic of a cramped under carriage is the gas tank being in close proximity to an exhaust system. Conventional metal gas tank walls do not provide insulation from these types of local heat sources.

Safety and crash worthiness is also an important factor in the design of modern vehicles. Conventional metal gas tanks usually consist of two diametrically opposed stamped shells that attach to one another. This attachment results in a seam that extends around the circumference of the gas tank. A second seam may also be created where a filler neck attaches to the gas tank wall. These seams are potential sources of failure.

Plastic fuel tanks are known in the patent literature as, for example, in U.S. Pat. No. 4,660,738 to Ives; U.S. Pat. No. 4,625,980 to Lyzohub; U.S. Pat. No. 4,602,722 to Ives; U.S. Pat. No. 4,518,091 to Scheurenbrand et. al.; U.S. Pat. No. 4,482,075 to Stotz et. al.; U.S. Pat. No. 4,453,564 to Bergesio; U.S. Pat. No. 4,416,303 to Scheurenbrand; U.S. Pat. No. 3,595,422 to Durrett, Jr.: U.S. Pat. No. 3,552,599 to Redding; and U.S. Pat. No. 3,470,907 to Shockey. However, while each of these designs may have purported advantages over their metal counterparts, substantial improvements to the art remain to be made.

SUMMARY OF THE INVENTION

Pursuant to the present invention a molded one piece plastic fuel tank is provided with a hollow interior liner having generally thin airtight walls. The exterior of the liner is covered by resin impregnated fibrous material. The liner advantageously serves the purposes of defining the hollow interior of the tank during molding, protecting the plastic shell from corrosive fuels, as well as providing a secondary fuel containment means for enhanced occupant safety in the event of impact.

The method for producing this fuel tank preferably utilizes a resin transfer molding technique where resin is injected into fibrous reinforcement material. During this process, fibrous material is placed on a thin-walled liner that generally conforms to the interior shape of the mold. The liner is then placed into the mold and serves as a support for the fibrous material that covers it. As resin is injected into the mold, the fibrous material between the exterior surface of the liner and the interior surface of the mold is impregnated. The liner supports this impregnated material thereby defining a hollow tank interior. Since the liner can be made of a material resistant to fuel corrosion the liner, which remains after the resin has cured, acts as a protective interior surface for the resin tank walls, if needed. In addition, the liner can serve as a type of flexible bag or pouch that may continue to contain fuel, even if the outer shell is damaged.

In accordance with a feature of this invention, the fibrous material is also arranged to provide an integral filler neck that avoids the need for a connection seam at the top surface of the tank. Elimination of this seam, along with the elimination of a circumferential seam inherent in conventional two piece metal gas tanks, provides further enhanced structural integrity for the tank.

In the preferred embodiment, the fibrous material is also arranged in layers at desired locations to allow for the placement of insulative material between the layers. When resin is subsequently injected into the mold and the layers of fibrous material are impregnated, the insulative material is sandwiched between the fibrous layers within the tank wall. This insulative material serves to insulate selected areas of the tank from disfavorable exterior environments. In the preferred embodiment, the insulative material shields the interior of the tank from heat generated by the exhaust system.

BRIEF DESCRIPTION OF THE DRAWINGS

The various advantages of the present invention will become apparent to one skilled in the art after reading the following specification and by reference to the drawings in which.

DESCRIPTION OF THE PREFERRED EMBODIMENT

It should be understood from the outset that while this invention will be described in connection with a particular example, that the scope of the invention need not be so limited since those skilled in the art will appreciate that its teachings can be used in a much wider variety of applications involving automotive fuel tanks and other applications where the containment of a material is desired. With this caveat in mind the present invention will be described in connection with molding a one piece plastic fuel tank 10.

Figure 1:
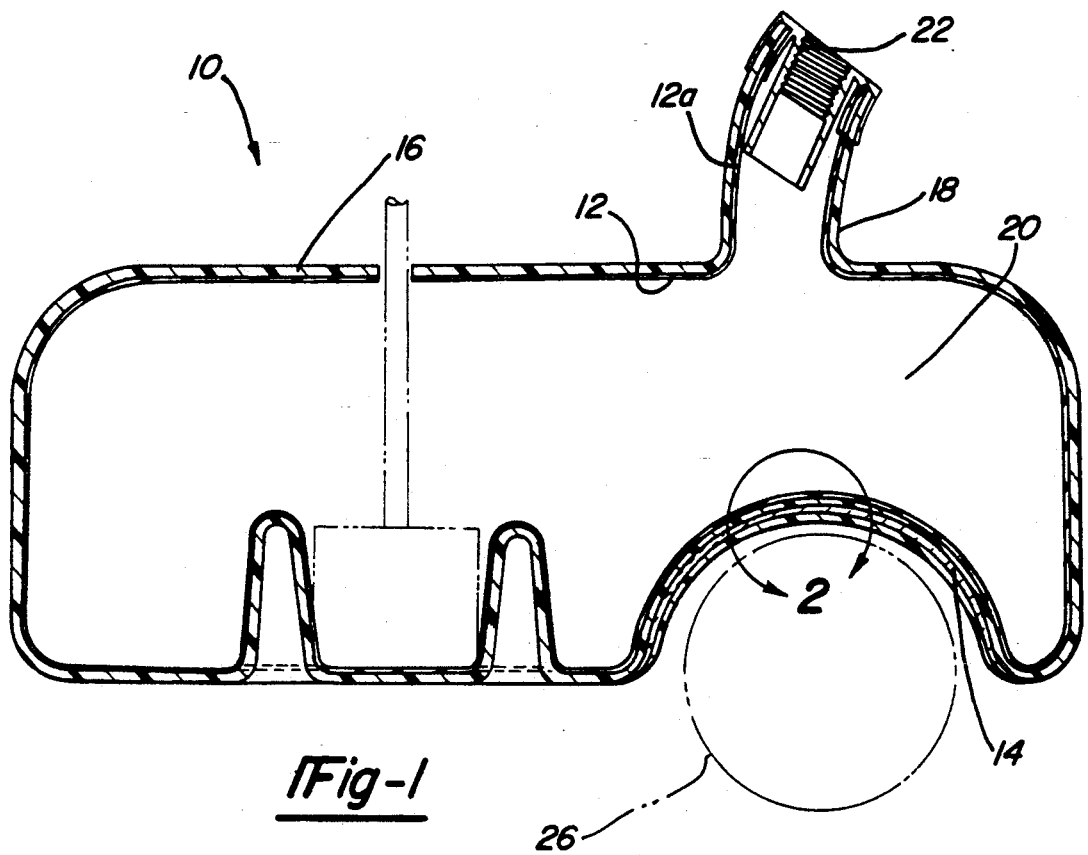
FIG. 1 is a cross sectional view illustrating a molded tank in accordance with the teachings of the present invention.

FIG. 1 illustrates a cross-section of the preferred embodiment for this tank 10. The tank 10 incorporates an interior liner 12, and an insulative material 14 that is disposed completely within a tank wall 16. The tank 10 also incorporates a conduit 18 defining a passage leading from an interior portion 20 of the tank 10 to a location away from the upper surface of the tank thereby providing a filler neck for the tank. The end of the filler neck conduit can be covered, if desired, by a more conventional metallic insert 22 for receiving a typical fuel tank threaded cap (not shown).

FIG. 1 also illustrates the construction of the tank wall 16. Generally, the wall 16 is defined by the interior liner 12 and a resin impregnated fibrous material 24. The impregnated fibrous material 24 forms the bulk of the tank wall 16, while the liner 12 covers the interior surface of the impregnated fibrous material 24. The tank wall 16 near an exhaust system 26 includes the interior liner 12 and impregnated fibrous material 24, as well as the insulative material 14. The insulative material 14 can be made of a phenolic foam, mineral batting material or other suitable material. Insulative material 14 is completely disposed within the tank wall 16 between inner and outer layers, 24a and 24b, of impregnated fibrous material. The insulative material 14 acts as a heat shield, as it insulates the interior 20 of the tank 10 from heat generated by the exhaust system 26.

Figure 2:
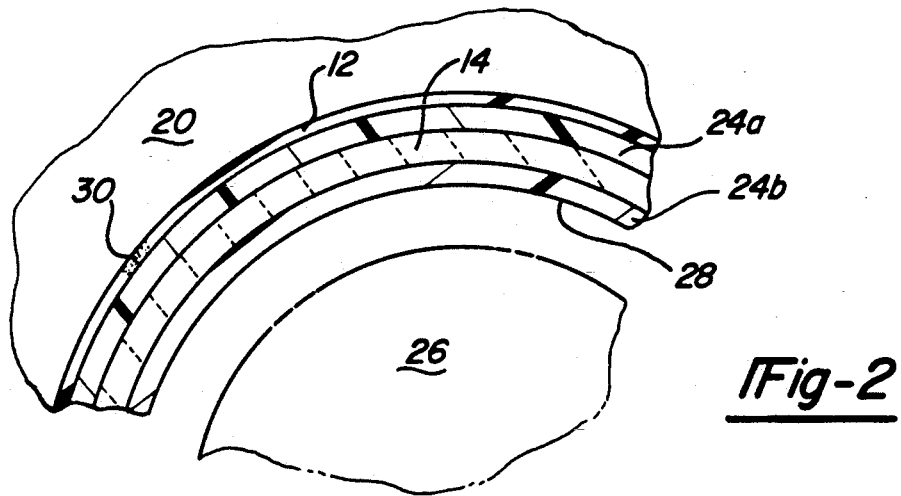
FIG. 2 is a partial cross sectional view of the tank wall near the exhaust system, along area "2" in FIG. 1, illustrating the insulative material disposed between layers of fibrous material.

FIG. 2 is an expanded view of the tank wall 16 near the exhaust system 26. Here, the layered construction of the tank wall 16 is clearly evident. Starting from the tank interior 20, the layered construction is shown as follows: the most interior layer is the liner 12; the next layer is resin impregnated fibrous material 24a; then the layer of insulative material 14; and finally another layer 24b of resin impregnated fibrous material. This final layer of impregnated fibrous material 24b defines the exterior tank surface 28. Also shown in FIG. 2 is the exhaust system 26 in close proximity to this exterior tank surface 28.

FIG. 1 also depicts a conduit 18 leading from the tank interior 20. The metallic filler neck insert 22 can be attached to the distal end of the conduit 18. Since the conduit 18 is incorporated into the one piece design of the tank 10, there is no seam at the tank wall 16. Rather, the conduit 18 extends from the tank 10 as a continuous extension of the tank wall 16. Therefore, a seam where a filler neck would normally attach to the tank wall is avoided, and the structural integrity of the tank is enhanced.

Figure 3:
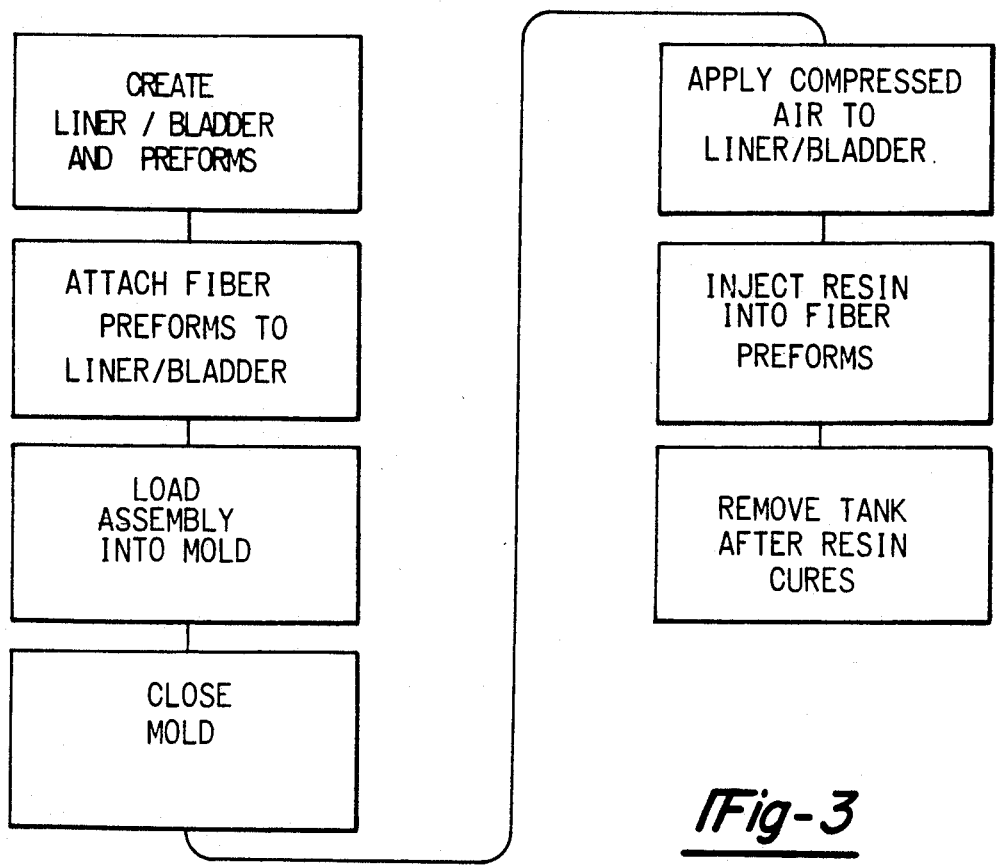
FIG. 3 is a flowchart describing the steps involved in the preferred method for molding the fuel tank.
Figure 5:
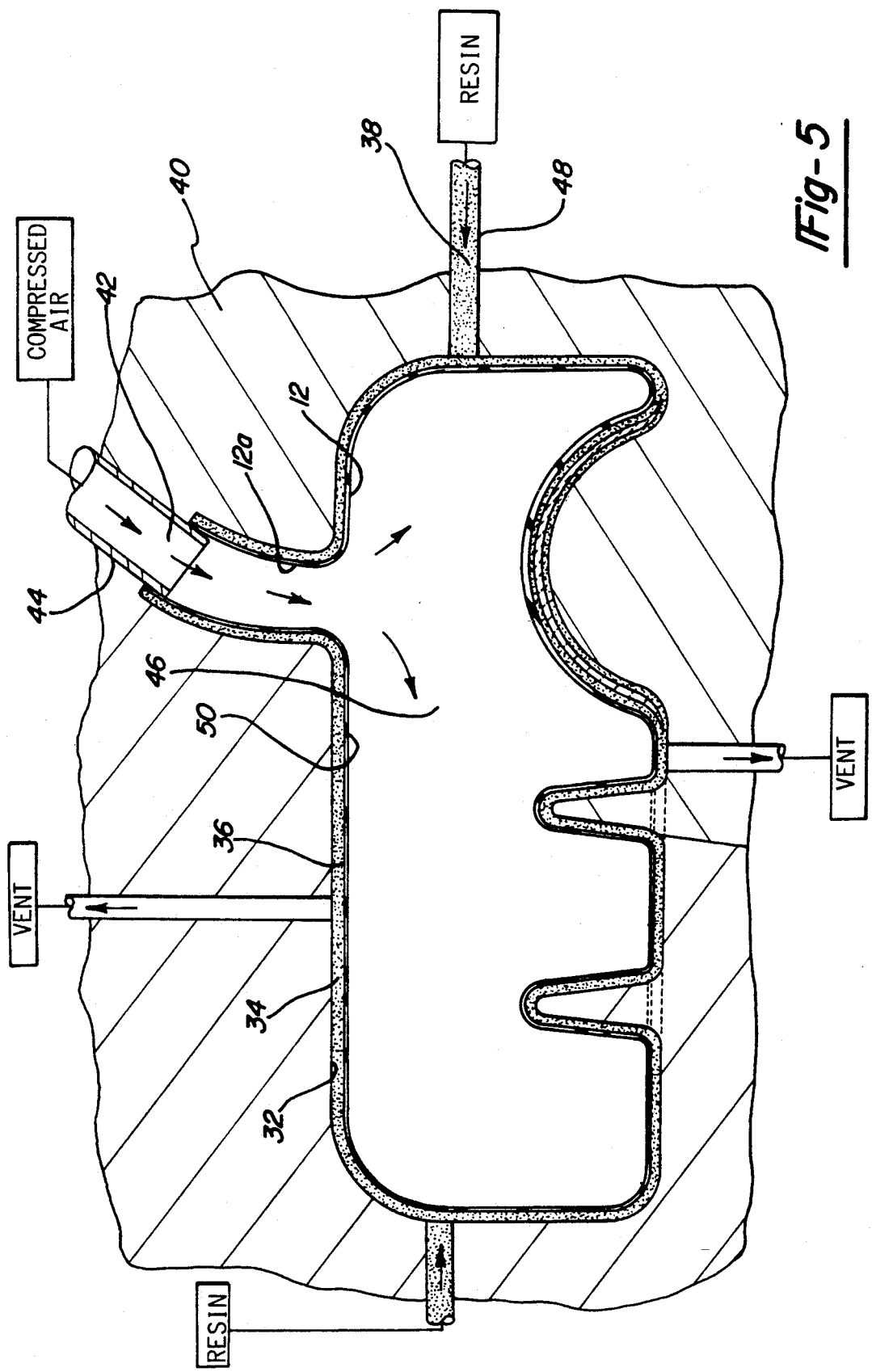
FIG. 5 is a cross sectional view of the mold illustrating the resin being injected into the fibrous material which is supported by the liner.

FIG. 3 is a flowchart that depicts the preferred steps involved in the process of molding the one piece plastic fuel tank 10. The first step is to create the interior liner 12. This liner 12 should generally be thin walled, airtight, fuel impervious and conform to an interior mold surface 32 as shown in FIG. 5. In the preferred embodiment, the liner 12 is made from a corrosion resistant material 30 such as polyethylene or polypropylene. This material 30 is impermeable and able to withstand prolonged exposure to methyl and ethyl alcohol, and gasoline blends which could otherwise degrade the plastic tank wall 16 depending on the type of resin system employed. As will be seen, the liner 12 is required to be airtight since compressed air is pumped into the liner 12 during the molding process. The liner 12 can be made in many ways such as blow molding, rotational molding or twin sheet thermoforming.

The next step on the flowchart is to attach fibrous material preforms 34 to the liner 12. The preforms consist of irregularly shaped shells of multiple fibers which are generally held in shape by a suitable binder. The preforms are preferably made by a process described in commonly assigned U.S. Pat. No. 5,039,465, filed Apr. 24, 1990, entitled "Method and Apparatus For Forming Fiber Reinforced Plastic Preforms From A Wet Slurry" by Freeman et al which is hereby incorporated by reference. Attaching these preforms involves suitably adhering the fibrous material preforms 34 on the exterior liner surface 36. Note, when the fibrous preforms 34 are placed on the exterior liner surface 36, the fibers may be selectively oriented to achieve maximum structural integrity.

In the preferred embodiment, the liner 12 has a tubular extension 12a that extends outwardly from the exterior surface 36 of the liner 12. This tubular extension 12a corresponds to the location of the conduit 18 leading from the tank interior 20. The fibrous material preforms 34 may themselves include extensions which conform to lever extension 12a or additional fibrous material may be wrapped around the tubular extension 12a of the liner 12. When this fibrous material is subsequently impregnated, the conduit 18 leading from the tank interior 20 is formed.

Figure 4:
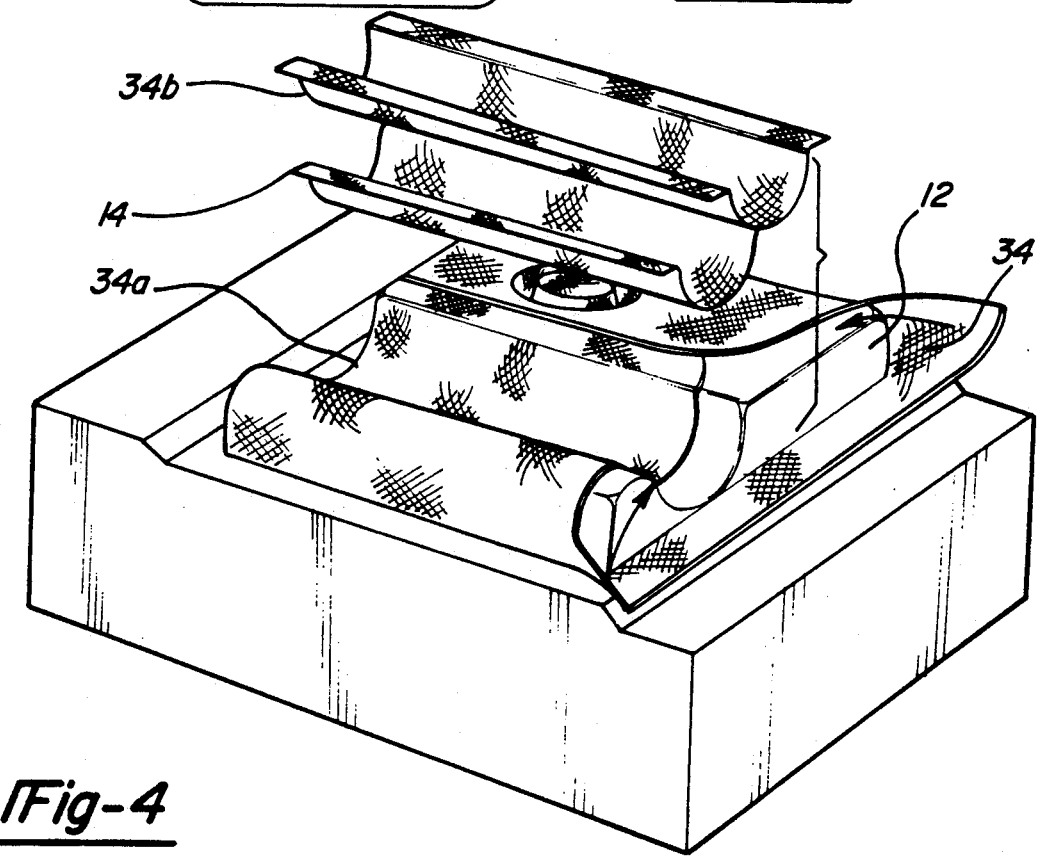
FIG. 4 is an exploded, perspective view of an insulative material being placed between layers of fibrous material and subsequently being placed on the liner.

As discussed previously, insulative material 14 may be placed between layers of the fibrous material. As shown in FIG. 4, this process comprises layering the fibrous material preforms 34a and 34b on the liner 12, and placing insulative material 14 between these layers of fibrous material. When the fibrous material is impregnated, the insulative material 14 is completely surrounded and disposed within the impregnated fibrous material 24.

The next step in the process is to load the covered liner assembly into the mold 40. This entails placing the liner 12, covered with fibrous material, into the mold 40 and closing the mold 40. The covered liner 12 should substantially conform to the shape of the interior mold surface 32. Thus, the fibrous material 34 is supported by liner 12 in the gap between the exterior liner surface 36 and the interior mold surface 32.

The next step is to apply compressed air 42 to the liner 12. A source of compressed air 42 is connected to the conduit 18 via a suitable conduit 44 extending through the mold 40. By applying compressed air 42 to the interior liner cavity 46, via the conduit 18, the liner 12 becomes difficult to collapse. This allows the liner 12 to maintain its shape, and prevents the liner 12 from collapsing, when the resin 38 is injected.

The next step in the molding process is to inject a suitable resin 38 such as an epoxy or phenolic resin into the mold 40 as shown in FIG. 5. The resin 38 is injected into the mold 40 via a suitable conduit 48. This resin 38 impregnates the fibrous material that lies between the exterior liner surface 36 and the interior mold surface 32. As the resin 38 is injected, and impregnates the fibrous material, the compressed air 42 supports the liner 12 and keeps it from collapsing. While the resin 38 cures, the liner 12 also supports the resin impregnated material 24 and defines the interior tank surface 50.

The next step in the molding process is to open the mold 40 and remove the tank 10 after the resin 38 has cured. Once the resin 38 has cured, the completed tank 10 is removed from the mold 40 and the compressed air source is disconnected from the conduit 18. A metallic filler neck insert 22 may then be attached to the tank 10 immediately or during the assembly of the vehicle. Alternatively, the metal insert could be molded in place during the above-described molding process.

As discussed previously, the liner 12 remains in the tank 10 and acts as a protective surface for the tank walls made of the cured resin impregnated fibrous material 24 since the liner 12 is made of a corrosion resistant material. Liner 12 also serves as a "back-up" or secondary container for the fuel which would tend to continue to hold fuel even if the outer plastic shell should become damaged.

It should be understood that various modifications of the preferred embodiment will become apparent to those skilled in the art after a study of the specification, drawings, and following claims.

What is claimed is:

1. A method of molding a one-piece plastic fuel tank, said method comprising:

providing a mold having a mold surface for defining an exterior shape of said tank;

providing a molded generally thin walled hollow airtight, fuel impervious liner having a shape that generally conforms to said mold surface prior to being placed in said mold, said liner defining an interior surface for said tank;

covering an exterior surface of said liner with a fibrous material;

placing the covered liner into said mold;

thereafter applying fluid pressure to the interior of the covered liner;

injecting resin between the mold surface and the exterior liner surface thereby impregnating the fibrous material;

utilizing the fluid pressure in the liner to prevent the collapse of the liner during said step of injecting resin, said liner thereby defining said interior surface of the tank and providing a fuel resistant liner for the tank;

curing the resin;

opening the mold; and removing the tank from the mold.

2. The method of claim 1 wherein the liner is made of a corrosion resistant material that serves the purposes of acting as a protective liner for the resin impregnated fibrous material and as a secondary fuel container, as well as defining the interior hollow portion of the tank.

3. The method of claim 1 which further comprises:

placing an insulative material between layered pieces of fibrous material, thereby insulating selected areas of the tank from a disfavorable exterior environment.

4. The method of claim 3 wherein the insulative material is disposed completely within a wall of the tank.

5. The method of claim 1 which further comprises:

arranging the fibrous material to form a filler neck leading from the interior of the tank.

6. The method of claim 5 wherein the fibrous pieces forming said filler neck extend away from an upper surface of the tank.

* * * * *